US005190740A

United States Patent [19]

Narutani et al.

[11] Patent Number: 5,190,740

[45] Date of Patent: Mar. 2, 1993

[54] METHOD PRODUCING COMPOSITE OXIDES FOR USE AS STARTING MATERIALS FOR PRODUCING FERRITES

[75] Inventors: Tetsu Narutani; Hidekaku Yoshimatsu; Masakatsu Yamazaki, all of Chiba; Masao Tsuzaki; Fumiaki Yoshikawa, both of Tokyo; Katashi Takaki, Okayama, all of Japan

[73] Assignee: Kawasaki Steel Corporation, Japan

[21] Appl. No.: 624,054

[22] Filed: Dec. 7, 1990

[30] Foreign Application Priority Data

Jun. 21, 1990 [JP] Japan .................................. 2-161218
Jun. 26, 1990 [JP] Japan .................................. 2-165620
Jun. 26, 1990 [JP] Japan .................................. 2-165621

[51] Int. Cl.[5] .............................................. C01G 49/02
[52] U.S. Cl. ................................ 423/594; 252/62.62; 252/62.64
[58] Field of Search ..................... 423/594; 252/62.62, 252/62.64

[56] References Cited

U.S. PATENT DOCUMENTS 4,336,242 6/1982 Schmidberger et al. ........... 423/594
4,425,250 1/1984 Hibst .................................. 423/594
4,472,369 9/1984 Kambe et al. ........................ 423/594
4,765,920 8/1988 Gattuso et al. ...................... 423/594

FOREIGN PATENT DOCUMENTS 277245 8/1988 European Pat. Off. .
1389197 3/1964 France .
47-011550 2/1972 Japan .
63-17776 4/1988 Japan .

OTHER PUBLICATIONS

WO88/00925 published Feb. 1988.
"The Importance of Hydrochloric Acid Regeneration, Processes for the Industrial Production of Ferric Oxides and Ferrite Powder," Ferrites Proceedings of the International Conference Sep., Oct. 1980, Japan, pp. 64–67.

*Primary Examiner*—Wayne Langel
*Attorney, Agent, or Firm*—Austin R. Miller

[57] ABSTRACT

A method for producing an oxide useful as a starting material for making soft ferrites comprised mainly of iron, zinc and at least one metal selected from manganese, magnesium, nickel and copper is described. In the method, while chlorides of metals other than zinc are roasted for oxidation to produce a composite oxide, zinc oxide is added during the roasting. This method ensures addition of zinc oxide at high yield without use of zinc chloride having a high vapor pressure. The resultant oxide for ferrites has desired ratios of metal constituents and contains spinel ferrites which are intermediate products with zinc oxide being uniformly dispersed. The use of the starting oxide leads to omission of a calcination step and a powder mixing step in the production process of ferrites. Ferrites with good quality can be obtained by direct sintering.

An alternative method using zinc chloride instead of zinc oxide is also described which can provide an equivalent oxide for making ferrites.

17 Claims, 10 Drawing Sheets

METHOD PRODUCING COMPOSITE OXIDES FOR USE AS STARTING MATERIALS FOR PRODUCING FERRITES

BACKGROUND OF THE INVENTION

1. Field of the invention

This invention relates to a method for producing ferrites and more particularly, to an improvement in the method for producing composite oxides used as starting materials for making high-quality ferrites, wherein chlorides or oxides of metals constituting soft ferrites are provided as a starting material.

2. Description of the Prior Art

In general, the industrial method of production of ferrites comprises mixing compounds such as oxides or carbonates of metals such as iron, manganese, magnesium, nickel, copper, zinc and the like used to constitute ferrites, at predetermined molar ratios, subjecting the mixture to calcination (preliminary sintering), pulverizing, granulating and molding, and finally sintering at high temperatures. However, this method has the problem that it requires the use of a calcination step wherein relatively high temperature and long time are used, influencing the quality of the product such as the incorporation of impurities during the production process and non-uniformity of quality as viewed microscopically and needing a long production time and a great amount of energy.

In general, starting iron oxides used as a major proportion of compositions for making ferrite are, in most cases, obtained by subjecting hydrochloric acid pickling waste liquors generated in the hot-rolling process of steel sheets or coils to high temperature oxidation roasting using a spray roasting furnace.

After the mixing, these metal oxides are thermally heated at the time of calcination or sintering and react to finally form a single phase having a spinel structure after going through an intermediate formation phase such as $ZnFe_2O_4$, $ZnMn_2O_4$, $MnFe_2O_4$ or the like.

In the above-stated series of ferrite production steps, the uniform dispersion of the respective oxides by mixing greatly influences the magnetic characteristics of a final ferrite product. Accordingly, improvement has been demanded while taking economy into consideration.

With respect to the phase change at the time of sintering, the intermediate formation phases such as $ZnFe_2O_4$ and $MnFe_2O_4$ are volumetrically expanded at 1.5 to 2% and 0.3 to 0.5%, respectively, during their formation. Accordingly, if the calcination step is omitted, press molding is given a cyclic stress owing to the expansion and subsequent shrinkage during sintering. As a result, the sintered products finally decrease in sintering density, involve defects such as deformation and cracks, and result in deterioration in accuracy of dimension and strength.

As an improved method for producing ferrites over the prior techniques, there has been proposed a production method wherein a mixed solution of chlorides of metals constituting ferrite is used as a starting material and roasted for oxidation (Japanese Patent Publication No. 47-11550). However, when all the starting materials are used in the form of metal chlorides, metal chlorides, such as zinc chloride having a high vapor pressure are vaporized during roasting, thus presenting the problem that such a metal can by no means reach the intended concentration in the product obtained from the bottom of the roasting furnace.

To avoid this, in Japanese Patent Publication No. 63-17776, there is proposed a method wherein, among metals constituting a ferrite, only metals whose chlorides are low in vapor pressure are provided as a mixed solution of the chlorides. This mixed solution is roasted for oxidation to obtain mixed oxides and/or partially reacted composite oxide. The oxides thus obtained are then mechanically mixed with oxides of metals whose chlorides have high vapor pressures. The mixture is directly sintered, without calcination, to obtain a ferrite. In this technique, with respect to the Zn ingredient, its oxide having a size of from 0.1 to 1 μm has to be mechanically mixed in a subsequent step. This leads to non-uniformity of the composition of the mixture, causing the magnetic characteristics of a final product to be degraded. This method is pronouncedly improved over the method using the respective powdered oxides as starting materials but the improvement is not satisfactory with respect to uniform dispersion.

As stated above, in the known methods for producing composite oxides used as starting materials for soft ferrites, metal chlorides, such as of Zn, having a high vapor pressure cannot be roasted in a high temperature roasting step simultaneously with other metal chlorides. After the roasting, this involves an additional mechanical mixing step, thus leaving room for a further improvement with respect to uniform dispersion or the incorporation of impurities.

SUMMARY OF THE INVENTION

An object of the invention is to provide a method for producing directly sinterable starting materials for soft ferrites such as Fe-(Mn, Mg, Ni)-Zn ferrites wherein main metal elements constituting the soft ferrite are roasted in the same roasting furnace at the same time to collect a powdery composite oxide from the bottom of the furnace while omitting subsequent steps of calcination and powder mixing as will be required in ordinary production processes.

Another object of the invention is to provide a method wherein uniform dispersion of zinc is ensured and the resultant ferrite product such as a ferrite core can be improved in characteristic properties such as magnetic and electric characteristics.

A further object of the invention is to provide a method for producing ferrite products wherein an intermediate phase as will be conventionally produced in calcination and sintering steps is preliminarily produced so that the volumetric expansion ascribed to the formation of the intermediate phase at the time of sintering without calcination is suppressed whereby there is finally obtained a ferrite product which has a high density and a high dimensional accuracy without involving any deformation or cracking.

A still further object of the invention is to provide a method wherein powdery composite oxides for use as starting materials for high-quality ferrites are produced efficiently in an economical manner.

In order to achieve the above objects, the present inventors made intensive studies on a method for producing composite oxides useful as starting materials for ferrites inexpensively and efficiently and, as a result, found that there could be solved the problems involved in the volatilization at the time of roasting of ingredients having a high vapor pressure, such as chlorides of metals including zinc and the problems of non-uniformity involved at the time of mechanical mixing of additives and poor economy. The present invention is accomplished based on the above finding.

More particularly, the present invention provides a method for producing oxides used as starting materials for soft ferrites containing as main components iron, zinc and at least one metal selected from the group consisting of manganese, magnesium, nickel and copper, which method comprises feeding, to a furnace, an aqueous solution of mixed chlorides consisting of iron chloride and a chloride of at least one metal selected from the group consisting of manganese, magnesium, nickel and copper, roasting the aqueous solution for oxidation at a high temperature to form a composite oxide of iron and at least one metal selected from the group consisting of manganese, magnesium, nickel and copper, and, at a position where the composite oxide is being formed or the composite oxide retains heat of roasting so that its temperature is not lower than 400° C., adding zinc oxide and/or a zinc compound which is readily convertible into zinc oxide at a temperature whereby an oxide is obtained which is useful as a starting material for making soft ferrites by the action of the heat of roasting.

In this case, the addition of the zinc oxide or compound, such as a carbonate or hydroxide, which is readily convertible into zinc oxide is effected in a roasting apparatus, preferably, in the form of a powder or a slurry and in the vicinity at which the aqueous solution is fed.

Further, after the aqueous solution of a mixture of iron chloride and at least one member selected from the group consisting of chlorides of manganese, magnesium, nickel and copper has been roasted for oxidation, the zinc oxide and/or the zinc compound readily convertible into zinc oxide may be added to the resultant oxide at the time of a dry dechlorination treatment carried out subsequently to the roasting treatment.

Alternatively, the mixed aqueous solution of the iron chloride and the member selected from chlorides of manganese, nickel, magnesium and copper may be adjusted in pH to a range of from 0.2 to 7.0. Thereafter, zinc oxide and/or a zinc compound readily convertible into zinc oxide is dispersed in the mixed solution and oxidized by roasting. Still alternatively, when the mixed solution whose pH has been adjusted to from 0.2 to 7.0 is oxidized by roasting, zinc compounds such as zinc oxide may be added at a position where the metal oxides are being formed and the metal oxides have a temperature of not lower than 400° C.

Still yet alternatively, an aqueous solution of mixed chlorides containing iron chloride and at least one chloride selected from the group consisting of chlorides of manganese, magnesium, nickel and copper is roasted for oxidation, whereupon zinc chloride may be added during the course where the metal oxides are being formed or the produced metal oxides have a heat of roasting and have a temperature of not lower than 400° C. but not higher than 900° C.

In this case, the zinc chloride is added by feeding a powder of zinc chloride or by spraying an aqueous solution of zinc chloride. Further, the zinc chloride may be added to the resultant metal oxides at the time of a dry chlorination treatment carried out subsequently to the roasting treatment. By this method, zinc chloride whose vapor pressure is high can be appropriately added.

DESCRIPTION OF THE PREFERRED EMBODIMENTS

Most industrially mass-produced soft ferrites are generally composed of about 70 wt % of $Fe_2O_3$, 15 to 30 wt % of $M^{2+}O$ wherein M represents Mn, Mg, Ni or the like, and 0 to 15 wt % of ZnO. Of these, Zn exhibits a high vapor pressure when used as a chloride. When zinc chloride is spray roasted along with other metals at the same temperature level, a large amount of zinc chloride is exhausted from the top of a furnace, with a considerable lowering in yield of zinc in the oxide collected from the bottom of the furnace.

Figure 9:
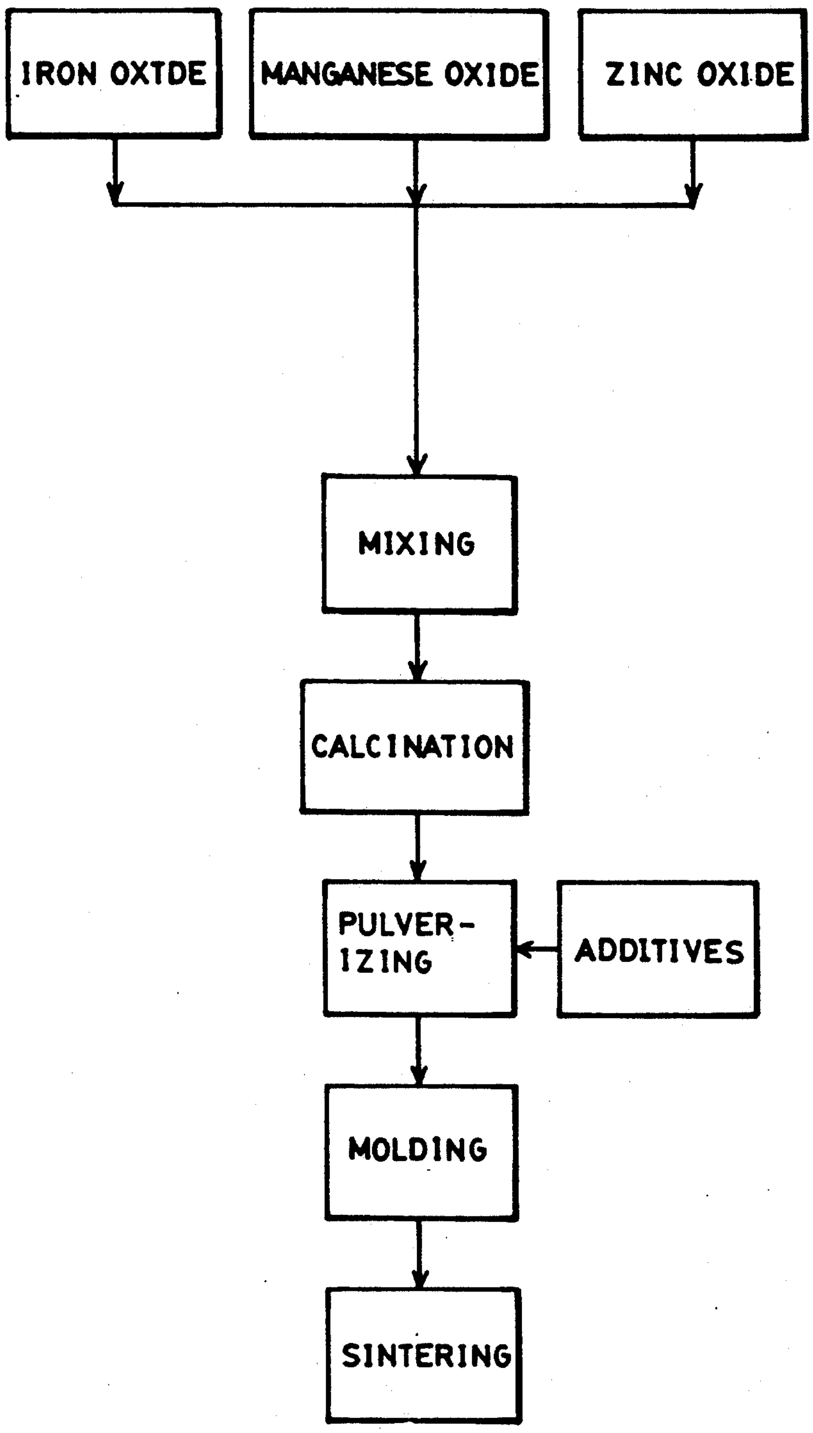
FIGS. 9 and 10 are, respectively, flow charts of prior art production processes of soft ferrites.
Figure 10:
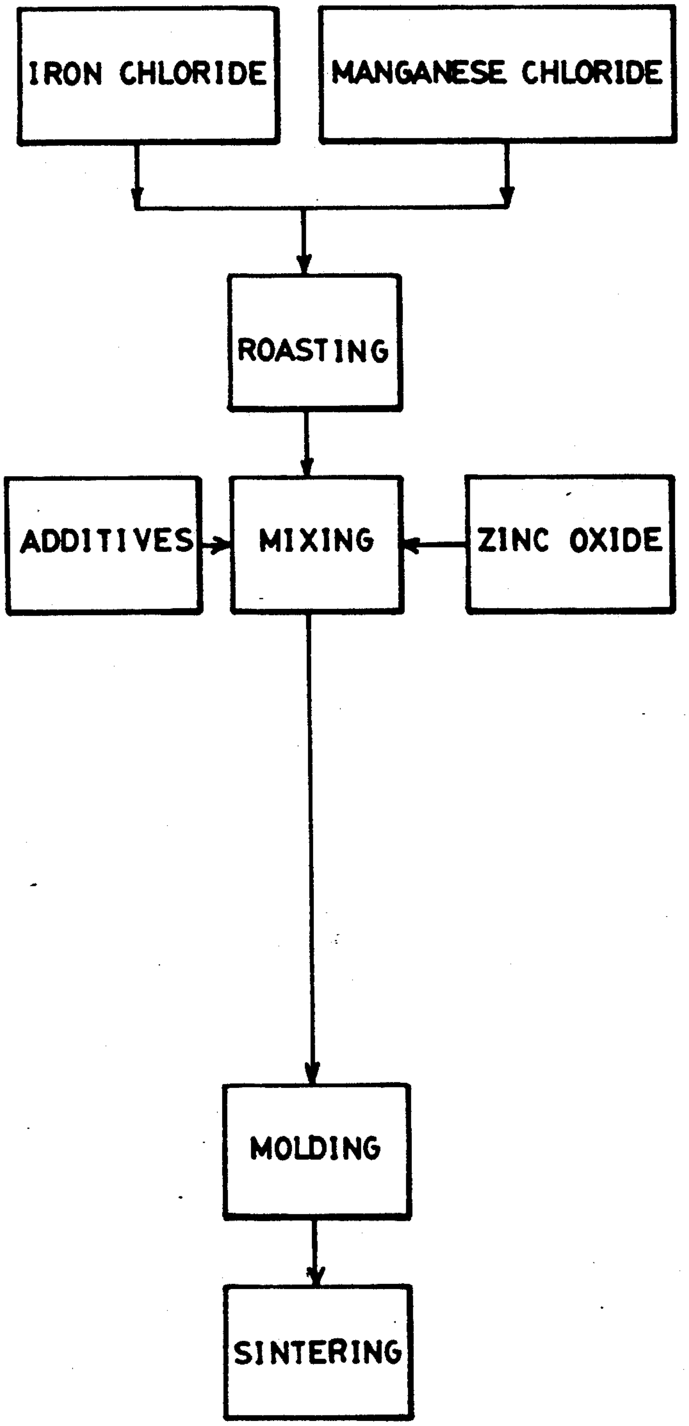

As shown in FIG. 9, in the conventional production of Mn-Zn ferrites, iron oxide, manganese oxide and zinc oxide are mixed at predetermined molar ratios, calcined at 800° to 1000° C., pulverized, granulated, molded and sintered. In this method, uniform mixing is not satisfactorily attained and the resultant product has not good magnetic characteristics. In addition, the calcination at 800° to 1000° C. is necessary, leading to high production costs and contamination with impurities at the time of pulverizing. FIG. 10 is an improvement of the above method wherein iron chloride and manganese chloride are used as starting materials for roasting. However, zinc chloride is not roasted for oxidation at the same time; such a step of mixing with zinc oxide is essentially included, thus presenting a problem of non-uniformity.

In the practice of the invention, roasting is characterized by adding at least one member selected from the group consisting of zinc oxide, carbonate and hydroxide in the form of a powder or slurry to a reaction zone where Fe and other metals such as Mn, Mg, Ni and Cu are converted to oxides or a spinel ferrite. More particularly, at least one of zinc oxide, carbonate or hydroxide in the form of a powder or slurry is added to (1) a step where Fe and other metals start to be converted to oxides or a spinel ferrite or (2) a step where Fe and other metals are being converted to oxides or spinel ferrite.

The above process is described based on a specific flow chart.

Figure 1:
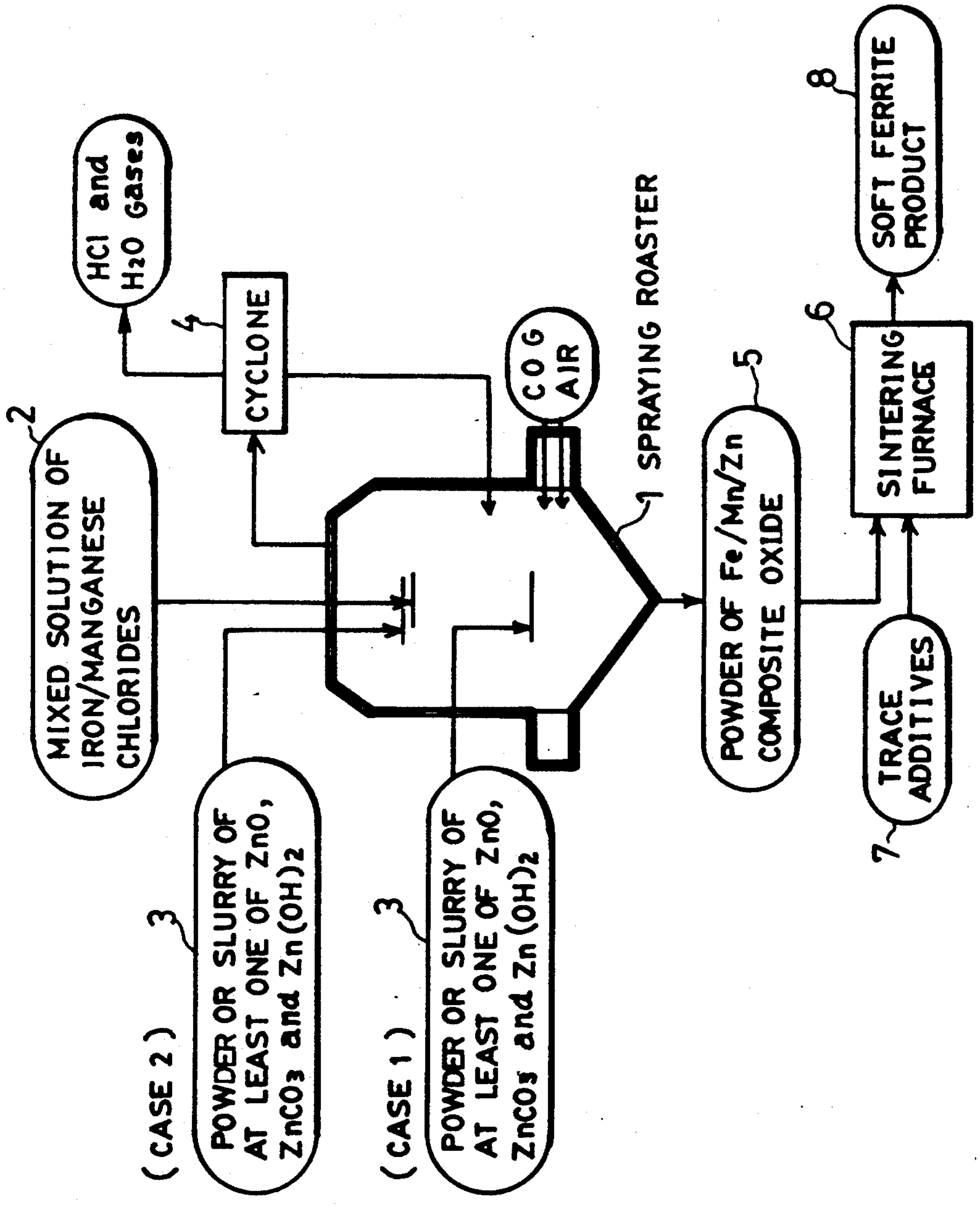
FIG. 1 is a flow chart showing an embodiment of the invention.

FIG. 1 is a flow chart of a method for producing a starting composite oxide for an Fe-Mn-Zn ferrite which is a typical soft ferrite material.

An aqueous iron chloride solution used as a starting material for roasting after mixing is obtained as a hydrochloric acid pickling waste liquor generated in the hot-rolling process of steel sheets or coils. On the other hand, a manganese chloride aqueous solution is obtained by directly dissolving a starting manganese material such as ferromanganese or manganese oxide dust in hydrochloric acid or the iron chloride aqueous solution. An Fe-Mn mixed chloride aqueous solution 2 is sprayed into a spray roasting furnace 1 by a conventional method and roasted for oxidation under high temperature conditions not lower than 400° C.

The starting zinc material is added is such a way that an amount of Zn necessary for the intended ferrite composition is fed in the form of at least one of zinc oxide, carbonate or hydroxide. The starting zinc material 3 may be fed either by method spraying method wherein a slurry is applied from a spray nozzle, or by blowing wherein the powder of the zinc material is blown through a nozzle while being entrained with a compressed gas carrier at an appropriate solid-to-gas ratio by weight, for example, of 10 to 12.

At least one member of zinc oxide, carbonate hydroxide may be fed at a position where the iron and manganese chlorides are converted to corresponding oxides (i.e. the same position as iron and manganese chlorides have been fed as with Case 2 in FIG. 1), or at a position where the iron and manganese chlorides are converting to corresponding oxides or a spinel ferrite (i.e. a position near an exit of a roasting apparatus rather than the feed position of the iron and manganese chlorides as with Case 1 in FIG. 1). The atmospheric temperature should be in the range of from 400° to 800° C. At least one of the added zinc oxide, carbonate or hydroxide is uniformly mixed and converted into a solid solution with Mn and Fe which are in the form of oxides or way of undergoing spinel formation reaction, thereby producing a reaction product (an intermediate to a spinel single phase) such as $ZnFe_2O_4$ or $ZnMn_2O_4$ in an efficient manner. It will be noted that fine powders of metal oxides partly discharged from the top of the roasting furnace along with decomposition gases is collected with a cyclone 4 and returned to the furnace 1.

The zinc oxide or the like material should be added to the furnace at a position at which the temperature is not lower than 400° C. The reason is that such a temperature is necessary for uniform solid solution of Mn and Fe undergoing oxidation or spinel formation reaction, with the added zinc oxide or the like material and for efficiently producing a reaction product such as $ZnFe_2O_4$ or $ZnMn_2O_4$. The preferable upper limit of the furnace temperature for the addition is approximately 900° C. where an ordinary roasting furnace is used although such temperature is not critical for carrying out the invention and should be determined in view of economy.

To the resultant composite oxide powder 5 are added trace additives 7, which is directly subjected to molding and then high temperature sintering in a sintering furnace 6 after molding to obtain a ferrite-sintered core product 8 having good magnetic characteristics and a high dimensional accuracy without involving any deformation and cracking. As stated hereinabove, homogeneous mixing-oxidation-spinel formation reaction in a single roasting process of Fe-Mn-Zn becomes possible. Thus, calcination and mechanical mixing of starting zinc material as will be ordinarily performed can be omitted. The thus obtained soft ferrite products are excellent in magnetic characteristics and dimensional accuracy.

Figure 2:
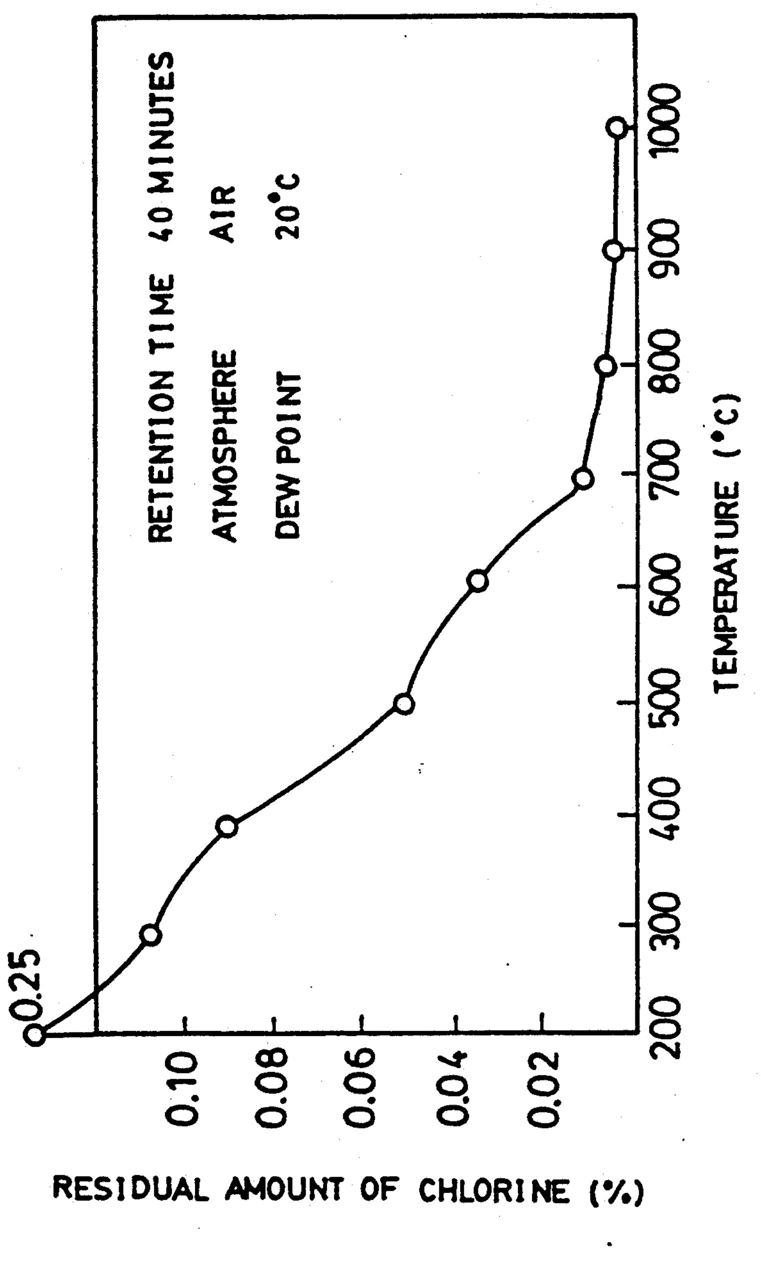
FIG. 2 is a graphical representation of the relation between the residual amount of chlorine and the temperature.

The dechlorination and the promotion of the spinel formation reaction of the starting oxides are described. Aqueous solutions of $FeCl_2$ and $MnCl_2$ were mixed at a predetermined molar ratio, after which the mixture was spray roasted at 800° C. The resultant oxide composition had a composition of $Fe_2O_3:Mn_2O_3=75.3:24.7$ (wt %) and the residual chlorine content was 0.30%. The mixed oxides were heated in a stream of air at a temperature ranging from 200° to 1000° C. for 40 minutes. The variation in the residual amount of chlorine is shown in FIG. 2.

In order to reduce the residual amount of chlorine to not greater than 2.20 wt %, the lower limit of the treating temperature should be 300° C. On the other hand, over 1000° C., is unfavorable in that sintering of the powder proceeds excessively and it takes a long time for a subsequent pulverizing step.

Next, there are described the results of an experiment from which a procedure of mixing zinc oxide and an aqueous solution of a chloride of a metal such as iron, manganese, nickel, magnesium and the like and then roasting these ingredients at the same time has been developed.

Guaranteed hydrochloric acid reagent was dissolved in hot pure water of 80° C. to prepare hydrochloric acid aqueous solutions having the following values of pH.

Sample 1: pH = −0
Sample 2: pH = 0.1
Sample 3: pH = 0.2
Sample 4: pH = 0.4
Sample 5: pH = 1.0
Sample 6: pH = 2.0

400 g of guaranteed zinc oxide (ZnO) was added to one liter of each solution (kept at 80° C.) and agitated by means of a stirrer, followed by filtration and determination of the dependence, on acidity, of the amount of dissolved zinc oxide in the respective pH solutions from the amount of remaining zinc oxide.

Figure 3:
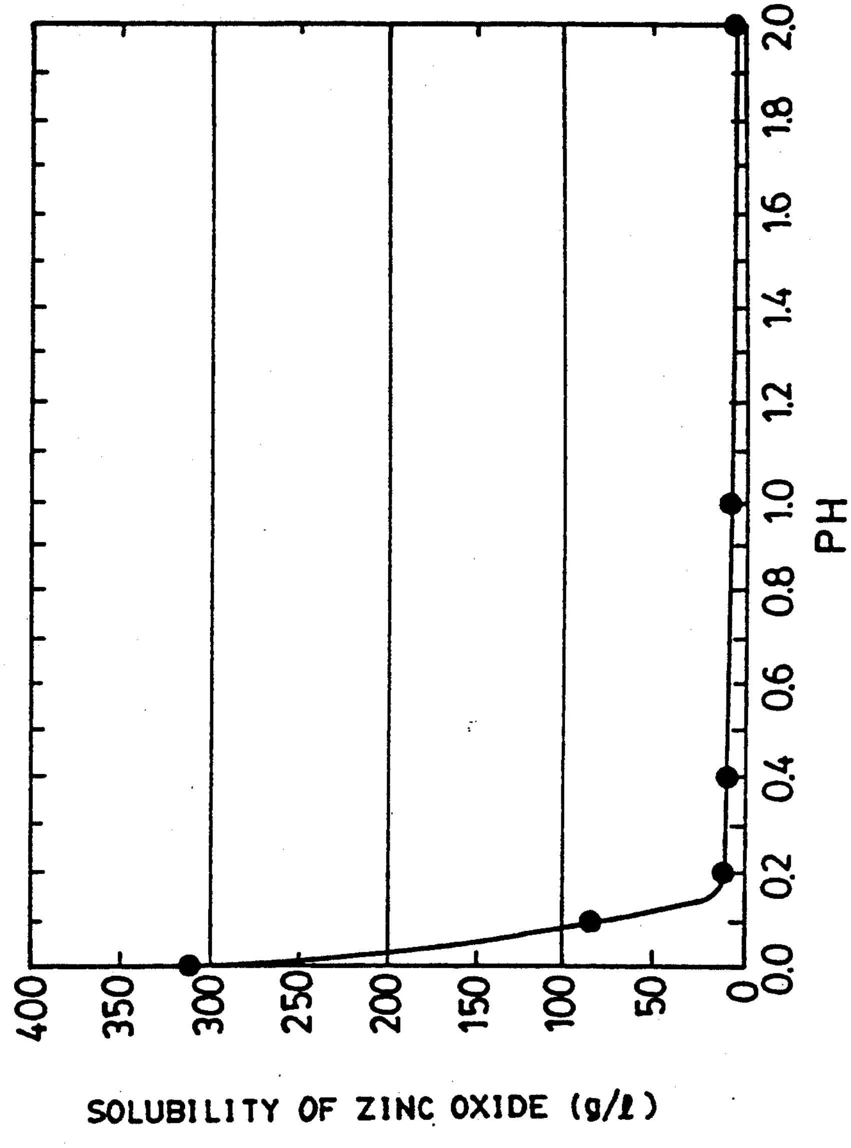
FIG. 3 is a graphical representation of the pH dependence on the solubility of zinc oxide in an acidic solution.

The results are shown in FIG. 3, revealing that when the pH exceeds 0.2, inclusive, the amount of zinc oxide dissolved in the acidic solution is significantly reduced. More particularly, when the pH value is not less than 0.2, the amount of the dissolved zinc oxide is found to be not larger than 5 g/liter. Accordingly the adjustment of the pH of the chloride solution to not less than 0.2 makes it possible to roast for oxidation the chloride solution admixed with zinc oxide without significant dissolution of zinc oxide in the chloride solution.

With regard to the upper limit of the pH, when the pH is larger than 7.0, metal ions form hydroxides and settle. Accordingly, the pH is preferably not larger than 7.0.

A procedure of adding zinc oxide or a zinc compound capable of ready conversion to a corresponding oxide after completion of oxidation of chlorides of ferrite constituent elements in an oxidation roasting furnace or at the time of a subsequent dry dechlorination treatment is described.

This procedure is applied to the production of starting iron oxide for ferrites by roasting for oxidation an aqueous solution of iron chloride alone, which is a main constituent element for ferrites, or a mixture of Fe oxide and at least one member selected from the group of oxides of manganese, magnesium, nickel and copper. The starting chlorides may be a chloride of Fe alone or a mixture of chlorides of Fe and other elements except for Zn. The roasting for oxidation is performed by spraying the chloride solution in a furnace at 650° to 900° C. The chlorides are subjected to heat in the furnace and are converted to corresponding oxides. Preferably, zinc oxide and/or a zinc compound capable of ready conversion into a corresponding oxide is blown in an amount necessary for an intended ferrite composition into an oxide portion obtained after completion of the conversion reaction at a rate corresponding to the speed of formation of the oxides.

According to this procedure, the added ZnO disappears by the following reaction at a temperature between 500° and 800° C. by the action of thermal inertia of the oxidation and roasting reaction or the heat added to the starting oxides for the dechlorination treatment:

$$ZnO+Fe_2O_3 \rightarrow ZnFe_2O_4$$

$$ZnO+Mn_2O_3 \rightarrow ZnMn_2O_4$$

By the reaction, an undesirable expansion ascribed to the above reactions can be mitigated or fully removed in a subsequent step. In addition, this treatment results in preliminary mixing of zinc oxide or a zinc compound capable of conversion into a corresponding oxide with other oxides, ensuring the uniform dispersion of the constituent oxides.

The roasted oxides usually contain from about 0.1 to 0.4% of residual chlorine; such chlorine adversely influences the production of the ferrite. Accordingly, the oxides are heated at a given temperature or washed with water to reduce the content of the residual chlorine. A dechlorination treatment by heating may be performed by connecting, for example, a rotary kiln to the oxidation roasting furnace, by which thermal inertia at the time of the oxidation roasting of the oxides can be effectively utilized. In this case, zinc oxide or zinc compounds capable of ready conversion into zinc oxide may be blown into an inlet portion of the rotary kiln.

By this, it will be possible for the production of oxides of constituent elements for ferrites other than Zn to simultaneously add zinc oxide or a compound capable of ready conversion into a corresponding oxide thereby obtaining an oxide having an intended composition at one time. In the oxide powder discharged from the roasting furnace or from a subsequent dry dechlorinating apparatus, ZnO is converted to a $ZnFe_2O_4$ phase and, thus, ZnO substantially disappears, so that expansion does not take place at the time of the sintering step. In addition, the mixing step may be omitted in an ordinary case. In an ordinary case, the resultant oxide is molded and sintered as it is to obtain a final product. Depending on the type of ferrite, $SiO_2$, $CaCO_3$ and the like may be added. In this case, the mixing step cannot be omitted.

In the above embodiments, the addition of zinc oxide and/or a zinc compound capable of ready conversion into a corresponding oxide has been described. Although the manner of addition of zinc oxide and/or a zinc compound capable of ready conversion into zinc oxide is not critical, it is important to obtain uniform mixing with starting oxides. For instance, a compressed air carrier may be used wherein ZnO powder is blown through a nozzle at an appropriate ZnO powder/air ratio by weight, for example, of 10 to 12, or by a method where ZnO is dispersed in water and the resultant dispersion is blown. The resultant starting oxides for ferrites are molded and sintered after addition of trace additives, if necessary, to obtain a sintered core product having good magnetic characteristics and a high dimensional accuracy without involving any deformation and cracking. Thus, in the practice of the invention, the mixing and calcining steps which will be essentially required in conventional production processes can be omitted. Even if the oxide composition is required to be finely controlled or admixed with trace additives, the mixing operation becomes very simple.

Figure 4:
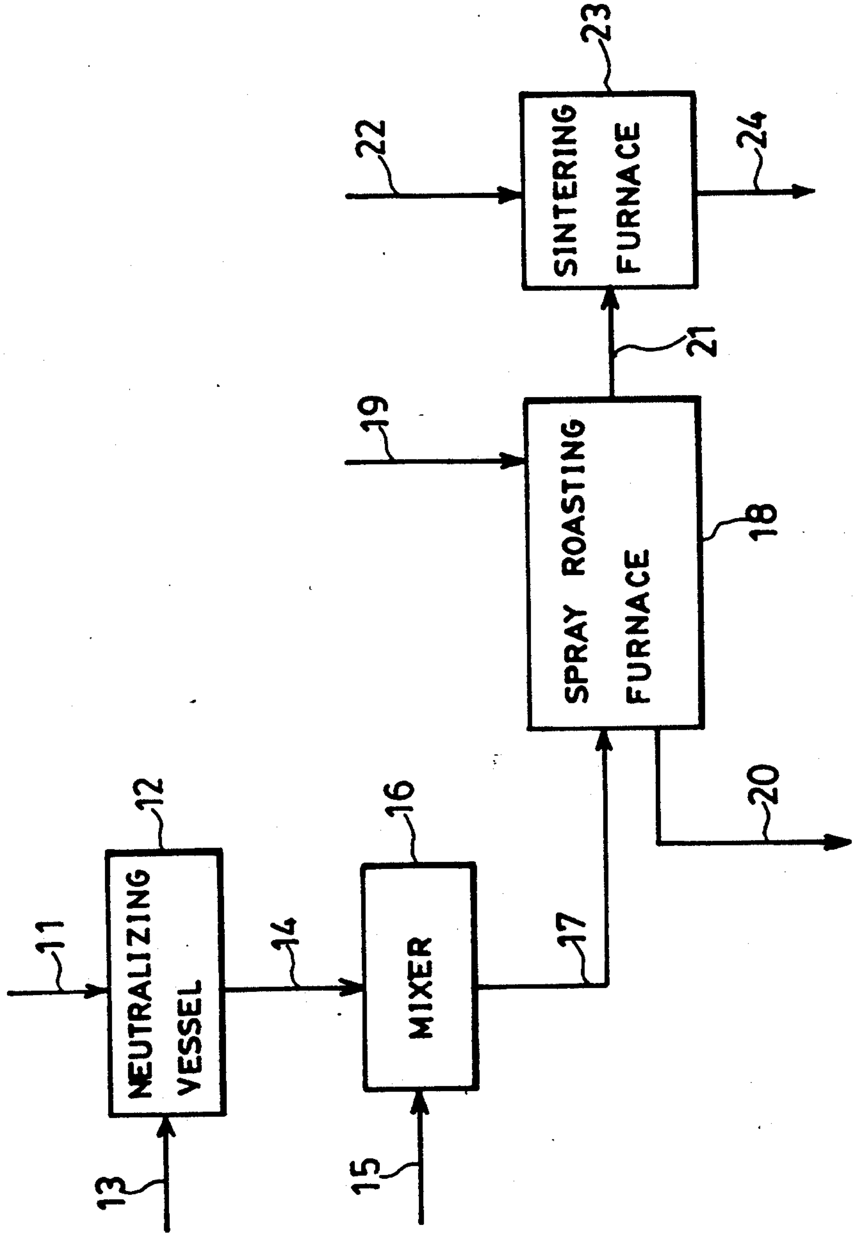
FIG. 4 is a flow chart showing a production process of a starting composite oxide for Mn-Zn ferrite according to the invention.
Figure 5:
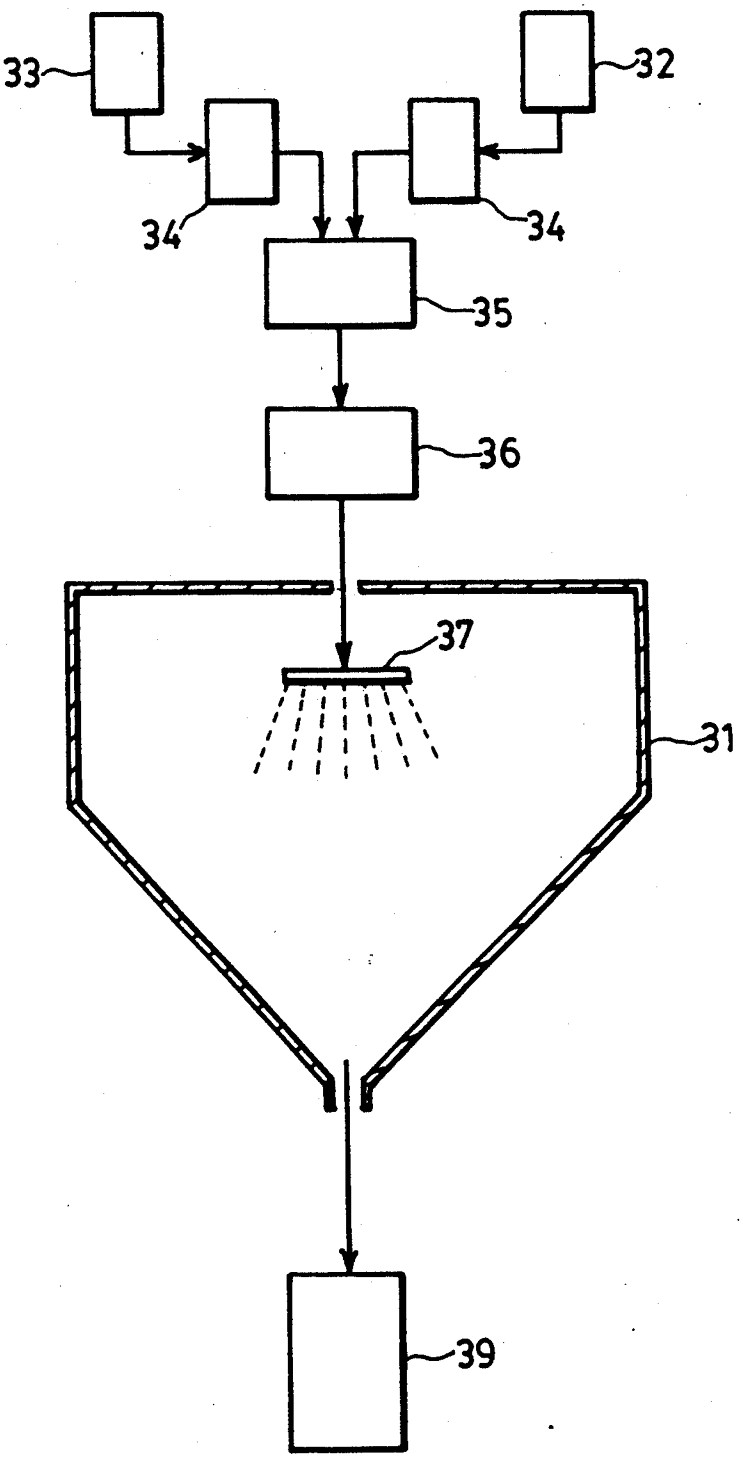
FIGS. 5 and 6 are, respectively, schematic views of oxidation roasting furnaces of starting oxides for soft ferrites according to an example of the invention and for comparison.

A further embodiment is described with reference to FIG. 4 wherein an aqueous solution of mixed chlorides of iron and other metals such as manganese, magnesium, nickel and copper is provided as a starting material. The free hydrochloric acid in the chloride solution is neutralized, and to the neutralized solution a powder and/or an aqueous slurry of zinc oxide is added to obtain a slurry. The thus obtained slurry is immediately fed to a spray roasting furnace before any metal substitution reaction of Zn with metals, such as Fe and Ni, having an ionization tendency smaller than Zn and simultaneously roasted for oxidation.

An aqueous solution 11 of mixed chlorides of Fe and Mn is neutralized in a neutralization vessel 12 by means of a neutralizing agent 13 to a pH of not less than 0.2, preferably not less than 0.7. With a pH of less than 0.2, when zinc oxide 15 is added into a mixer 16, a large amount of zinc oxide is converted into a corresponding chloride. In the case when roasted in a spray roasting furnace 18, the zinc chloride having a high vapor pressure is volatilized during the roasting, so that the content of zinc in the product 21 collected from the bottom of the roasting furnace 18 is lower than the intended concentration.

A neutralized or pH adjusted chloride mixed solution 14 is subsequently introduced into a mixer 16, to which a powder or an aqueous slurry of zinc oxide is added, thereby obtaining a zinc oxide slurry 17 of the aqueous solution of the Fe and Mn mixed chlorides. The zinc oxide 15 fed to the mixer 16 is preferably used in the form of a powder in order not to lower the concentration of the mixed chloride aqueous solution. Of course, zinc oxide may be fed in the form of an aqueous slurry. With the aqueous slurry, the concentration should preferably be as high as possible s that the amount of fuel in the roasting furnace 18 is saved.

The zinc oxide slurry 17 of the Fe and Mn mixed chloride aqueous solution is immediately fed to the spray roasting furnace 18, before the metal substitution reaction between zinc suspended in the slurry and metals having a smaller ionization tendency (Fe in the case of Mn-Fe ferrites) does not proceed, and roasted for oxidation at the same time. In that case, the zinc oxide slurry 17 should preferably be fed to the roasting furnace 18 within 30 minutes, preferably within 5 minutes, after the mixing.

The zinc oxide slurry 17 of the Fe and Mn mixed chloride aqueous solution is sprayed in the spray roasting furnace 18 and roasted for oxidation under high temperature conditions of 850° to 900° C. by combustion of a fuel 19 supplied to the roasting furnace 18. During the course of the roasting for oxidation, Fe and Mn undergo the spinel reaction with zinc oxide, thereby efficiently producing a very uniform reaction product (an intermediate to a spinel single phase) such as $ZnFe_2O_4$ or $ZnMn_2O_4$. Combustion exhaust gas, hydrogen chloride and evaporated water vapor 20 are exhausted from the top of the roasting furnace 18.

To the thus obtained composite oxide powder 21 are added trace additives 22 such as $SiO_2$, $CaCO_3$ and the like, followed by mixing, molding and direct high temperature sintering in a sintering furnace 23, thereby obtaining a ferrite sintered core product 24 which has good magnetic characteristics and a high dimensional accuracy without any deformation and cracking.

As described above, in the production of a powdery composite oxide by mixing a solution of a chloride of iron which is a main constituent element for ferrites and a solution of manganese chloride and spray roasting the mixture, the free hydrochloric acid in the Fe and Mn chloride aqueous solution is neutralized and then zinc oxide is suspended in the neutralized chloride aqueous solution to obtain a slurry. Immediately, the slurry is fed to the roasting furnace and spray roasted therein to ensure homogeneous mixing, oxidation and spinel conversion of Fe-Mn-Zn by the single roasting step while omitting mechanical mixing and calcination of a starting zinc material as will be performed in ordinary processes. The thus obtained soft ferrite product has good magnetic characteristics and dimensional accuracy.

The results of an experiment on which another embodiment has been based are described, in which when a mixed solution of iron chloride and at least one chloride selected from chlorides of manganese, magnesium, nickel and copper is roasted for oxidation, zinc chloride is added during the course of forming the metal oxides.

1500 g of guaranteed iron chloride and 500 g of guaranteed manganese chloride were dissolved in 4000 g of hot pure water at 80° C., followed by fully drying in a glow box wherein $N_2$ gas was passed. The dried powder was heated in a transverse cylindrical furnace at a rate of 600° to 700° C./hour, followed by withdrawal from the furnace and cooling in air. The resultant oxide was subjected to qualitative analysis through X-ray diffraction, revealing that $Mn_2O_3$ and $Fe_2O_3$ alone existed. 100 g of the oxides were weighed, over which an aqueous solution of 13 g of guaranteed zinc chloride in 50 g of hot pure water at 80° C. was sprayed for mixing with a sprayer. The powder was heated in a transverse cylindrical furnace in air at a rate of 600° C./hour to temperatures of 300° C., 400° C., 500° C., 600° C., 700° C., 800° C., 900° C. and 950° C., followed by withdrawal from the furnace and cooling in air to obtain products.

The respective products were subjected to qualitative analysis through X-ray diffraction with the results shown in Table 1. Table 1 shows the results of the X-ray qualitative analysis of the products for different roasting temperatures. At 300° C., zinc chloride is left. At temperatures of 400° C. or over, zinc chloride completely reacts with the oxides and is converted to $ZnMn_2O_4$ or a spinel phase. Table 2 shows the results of chemical analysis of Fe, Mn and Zn compositions of the respective products for different roasting temperatures.

The results of the chemical analysis shown in Table 2 revealed that over 900° C., the content of zinc starts to deviate. The results of the analysis are indicated so that the total of Fe, Mn and Zn is 100 wt %. From the above, it will be seen that the roasting temperature after addition of the chlorides is preferably in the range of from 400° C. to 900° C.

From these experimental results, it will be clear that when zinc chloride having a high vapor pressure and iron and manganese oxides are mixed and roasted at a temperature of from 400° to 900° C., the zinc chloride completely reacts with these oxides to readily obtain a composite oxide containing zinc.

TABLE 1

| Sintering | X-ray Qualitative Analysis | | | | |
|---|---|---|---|---|---|
| Temperature | $Fe_2O_3$ | $Mn_2O_3$ | $ZnCl_2$ | $ZnMn_2O_4$ | Spinel |
| 300° C. | ○ | ○ | ○ | | |
| 400° C. | ○ | ○ | | ○ | ○ |
| 500° C. | ○ | ○ | | ○ | ○ |
| 600° C. | ○ | ○ | | ○ | ○ |
| 800° C. | ○ | ○ | | ○ | ○ |
| 900° C. | ○ | ○ | | ○ | ○ |
| 950° C. | ○ | ○ | | ○ | ○ |

○ indicates a confirmed phase or phases.

TABLE 2

| Sintering | Results of Analysis (wt %) | | |
|---|---|---|---|
| Temperature | Fe | Mn | Zn |
| 300° C. | 69.0 | 23.0 | 8.0 |
| 400° C. | 69.2 | 23.0 | 7.8 |
| 500° C. | 69.5 | 23.9 | 7.6 |
| 600° C. | 69.8 | 22.6 | 7.6 |
| 800° C. | 69.9 | 22.8 | 7.4 |
| 900° C. | 69.9 | 22.8 | 7.3 |
| 950° C. | 70.7 | 23.3 | 6.0 |

As will be apparent from the above, roasting for oxidation of a starting material having so high a vapor pressure as to be difficult in roasting is possible when such a material is roasted along with oxides of iron and manganese (or nickel, magnesium or the like), and it readily reacts with the oxides to obtain a composite oxide containing zinc.

The Zn chloride which is a metal whose chloride is high in vapor pressure may be added in the form of a powder or a solution as stated before.

The present invention is more particularly described by way of examples.

EXAMPLE 1

A starting iron material (hydrochloric acid waste liquor after pickling of a hot-rolled steel sheet: ferrous chloride aqueous solution) and a starting manganese material (solution of ferromanganese alloy in hydrochloric acid) were each filtered and purified and mixed at a predetermined molar ratio to prepare a chloride aqueous solution having a content of $FeCl_2$ of 342.7 g/l and a content of $MnCl_2$ of 111.8 g/l. This solution was fed to a spray roasting furnace at a rate of 3.0 $m^3$/hour and roasted at an atmospheric temperature of 800° C. at a trunk portion of the furnace, whereupon a ZnO suspension having a concentration of 15 wt % was sprayed at a rate of 0.55 $m^3$/hour through a nozzle at a position where the temperature was 600° C. (position of Case 1 in FIG. 1). As a result, there was obtained from the bottom of the furnace a mixed oxide powder having a composition of Fe:Mn:Zn=68.2:21.7:10.1 (on the weight basis) with any deviation in the composition. The results of X-ray diffraction analysis revealed that aside from the respective oxides, reaction products such as $ZnFe_2O_2$, $FeMn_2O_4$, $MnFe_2O_4$ and the like were detected.

To the mixed oxide powder were added 800 ppm of $CoCO_3$ and 100 ppm of $SiO_2$, followed by dissolution in pure water to obtain a 50% slurry and mixing for 20 minutes by means of a wet attritor. While any calcination step was omitted, the resultant slurry was dried with a spray dryer to obtain particles, press molded to from a troidal core and sintered at a maximum sintering temperature of 1300° C. to obtain a core having good magnetic and electric characteristics as shown in Table 3.

COMPARATIVE EXAMPLE 1

For comparison, the above procedure was repeated except that ZnO was not fed to the roasting furnace, thereby obtaining Fe/Mn mixed oxides. ZnO was subsequently added to the mixed oxides to have the same compositional ratios as used in Example 1, followed by addition of the additives (800 ppm of $CaCO_3$ and 100 ppm of $SiO_2$), treatment with a wet attritor and sintering in the same manner as in the above example. The resultant core had magnetic and electric characteristics indicated in Table 3.

TABLE 3

| | Sintering Density ($g/cm^3$) | Initial Magnetic Permeability (−) (90° C.) | Core Loss ($mW/cm^3$) (100 KHz, 200 mT, 90° C.) |
|---|---|---|---|
| Example 1 | 4.90 | 5520 | 280 |
| Comparative Example 1 | 4.78 | 3980 | 440 |

EXAMPLE 2

Aqueous solutions of $FeCl^2$ and $MnCl^2$ were mixed at a predetermined molar ratio and spray roasted at 850° C. to obtain oxides of $Fe_2O_3$:$Mn_2O_3$=75.1:24.9 (wt %). Immediately after the roasting, the content of residual chlorine was 0.26%. The roasted powder was passed to a rotary kiln for dechlorination directly connected to the roasting furnace, whereupon ZnO powder was blown through an oscillating nozzle to an inlet portion of the kiln using compressed air as a carrier. The mixed oxides of Fe and Mn were produced in the roasting furnace at a rate of about 700 kg/hour and ZnO was added correspondingly in an amount of about 60 kg/hour. The rotary kiln temperature was set at 750° C. and the atmosphere was air. These starting oxides were agitated in the kiln for about 40 minutes and dechlorinated.

The phase composition of the powder collected at the outlet of the kiln were 50% of $Fe_2O_3$, 38% of a spinel phase, 8% of $Mn_2O_3$ and 4% of $ZnMn_2O_4$ without detection of an ZnO. The residual chlorine content was reduced to 210 ppm.

To the mixed powder were further added 500 ppm of $CaCO_3$ and 200 ppm of $SiO_2$, calculated as CaO and $SiO_2$ contained after sintering, which was mixed for 10 minutes by means of an attritor. While omitting a calcination step, the mixture was dried for granulation with a spray dryer, press molded into a troidal core and sintered at 1320° C.

COMPARATIVE EXAMPLE 2

In the same manner as described in Example 2 except that ZnO was not added, there were obtained starting oxides, to which ZnO was added along with the Ca and Si sources in the same amounts as in Example 2, followed by repeating the procedure of Example 2, to thereby obtain a core for comparison. The density and magnetic characteristics are shown in Table 4. In part of the sintered cores for comparison, abnormal grain growth took place, so that some had a core loss exceeding 1000 $mW/cm^3$.

TABLE 4

| | Density ($g/cm^3$) | Core Loss ($mw/cm^3$) (100 KHz, 200 mT, 90° C.) | μi (90° C.) |
|---|---|---|---|
| Example 2 | 4.92 | 340 | 4350 |
| Comparative Example 2 | 4.77 | 720 | 3920 |

EXAMPLE 3

A hydrochloric acid pickling waste liquor of steel sheets was refined and treated to remove silicon therefrom, after which it was spray roasted at 760° C. at a rate of 750 kg/hour, calculated as produced iron oxide. A slurry of ZnO was blown into the bottom of the roasting furnace by means of a nozzle at a rate of 2.5 kg/minute of ZnO. The resultant oxides were retained for about 30 minutes at the bottom of the furnace for dechlorination. The powder had a composition having such phase ratios of 54.1% of $Fe_2O_3$, 44.4% of $ZnFe_2O_4$ and 1.5% of ZnO The content of residual chlorine was 0.09%.

To the oxides was added $Mn_3O_4$ at such a ratio that $Fe_2O_3$:MnO:ZnO=52.9:26.7:20.4 (by mole %), followed by calcination at 830° C., granulation by spray drying and press molding into a troidal core, and finally sintering at about 1390° C.

COMPARATIVE EXAMPLE 3

ZnO and $Mn_3O_4$ were added to $Fe_2O_3$ to have the same composition as in Example 3 and mixed, followed by treatment under the same conditions as in Example 3. The density and magnetic characteristics of the cores are shown in Table 5.

TABLE 5

| | Density ($g/cm^3$) | μiac (100 KHz, 20° C.) |
|---|---|---|
| Example 3 | 4.95 | 7200 |
| Comparative Example 3 | 4.86 | 4900 |

EXAMPLE 4

Solutions of $FeCl_2$, $NICl_2$ and $MnCl_2$ were mixed at predetermined molar ratios and spray roasted at 880° C., whereupon ZnO powder was blown at the lower portion of a roasting furnace in the same manner as in Example 2. The resultant oxides were retained for about 60 minutes at the bottom of the furnace partly for dechlorination treatment. The resultant powder had a composition in the form of oxides, calculated by weight, of $FeO_3$:NiO:MnO:ZnO=67.8:7.7:1.5:23.0. The measurement by X-ray diffraction revealed that ZnO was not detected. To the powder were added 0.05 wt % of $Bi_2O_3$ and 3 wt % of CuO, which was mixed for 10 minutes by means of an attritor, followed by granulation with a spray dryer, molding into a troidal core and sintering at 1150° C.

COMPARATIVE EXAMPLE 4

Oxides were prepared in the same manner as in Example 4 except that ZnO was not included, followed by adding of ZnO, $Bi_2O_3$ and CuO at the same ratios as in Example 4 and mixing for 10 minutes by means of an attritor (Comparative Example 4a), and a mixture of $Fe_2O_3$, NiO, $Mn_3O_4$, ZnO and $Bi_2O_3$ at the same ratios as in Example 4 was mixed for 10 minutes by means of an attritor (Comparative Example 4b). These powders were treated in the same manner as in Example 4 wherein calcination was omitted, thereby obtaining cores for comparison.

The thus obtained sintered cores had a density and magnetic characteristics indicated in Table 6.

TABLE 6

| | Density ($g/cm^3$) | μiac (100 KHz, 20° C.) |
|---|---|---|
| Example 4 | 5.18 | 2110 |
| Comparative Example 4a | 5.15 | 1570 |
| Comparative Example 4b | 5.07 | 860 |

EXAMPLE 5

Solutions of $FeCl_2$, $MgCl_2$ and $MnCl_2$ were mixed at predetermined molar ratios and spray roasted at 860° C., whereupon ZnO powder was blown at the lower portion of a roasting furnace in the same manner as in Example 2. The resultant oxides were retained for about 60 minutes at the bottom of the furnace partly for dechlorination treatment. The resultant powder had a composition in the form of oxides, calculated by weight, of $Fe_2O_3$:MgO:MnO:ZnO=66.9:12.2:8.0:12.9. The measurement by X-ray diffraction revealed that ZnO was not detected. The powder was dried with a spray dryer to obtain particles, molded into a troidal core and sintered at 1150° C. for 2 hours.

COMPARATIVE EXAMPLE 5

The oxides obtained in the same manner as in Example 5 except that ZnO was not included, to which ZnO was added as having such a composition as in Example 5,followed by mixing for 10 minutes by means of an attritor and repeating the same procedure as in Example 5 to obtain a sintered core for comparison.

The density, magnetic characteristic and specific resistance of the sintered cores are shown in Table 7.

TABLE 7

| | Density ($g/cm^3$) | Core Loss ($mw/cm^3$) (120 KHz, 100 mT, 100° C.) | Specific Resistance (Ω · cm) |
|---|---|---|---|
| Example 5 | 4.4 | 820 | $4 \times 10^9$ |
| Comparative Example 5 | 4.3 | 1750 | $1 \times 10^9$ |

EXAMPLE 6

3000 liters of a hydrochloric acid pickling waste liquor of steel sheets which had been concentrated to an extent that 25 g of iron was contained in 100 ml was charged with 250 kg of metallic manganese, followed by heating to 80° C. to completely dissolve the metallic manganese therein. The solution had a pH of not larger than 0.1.

Figure 6:
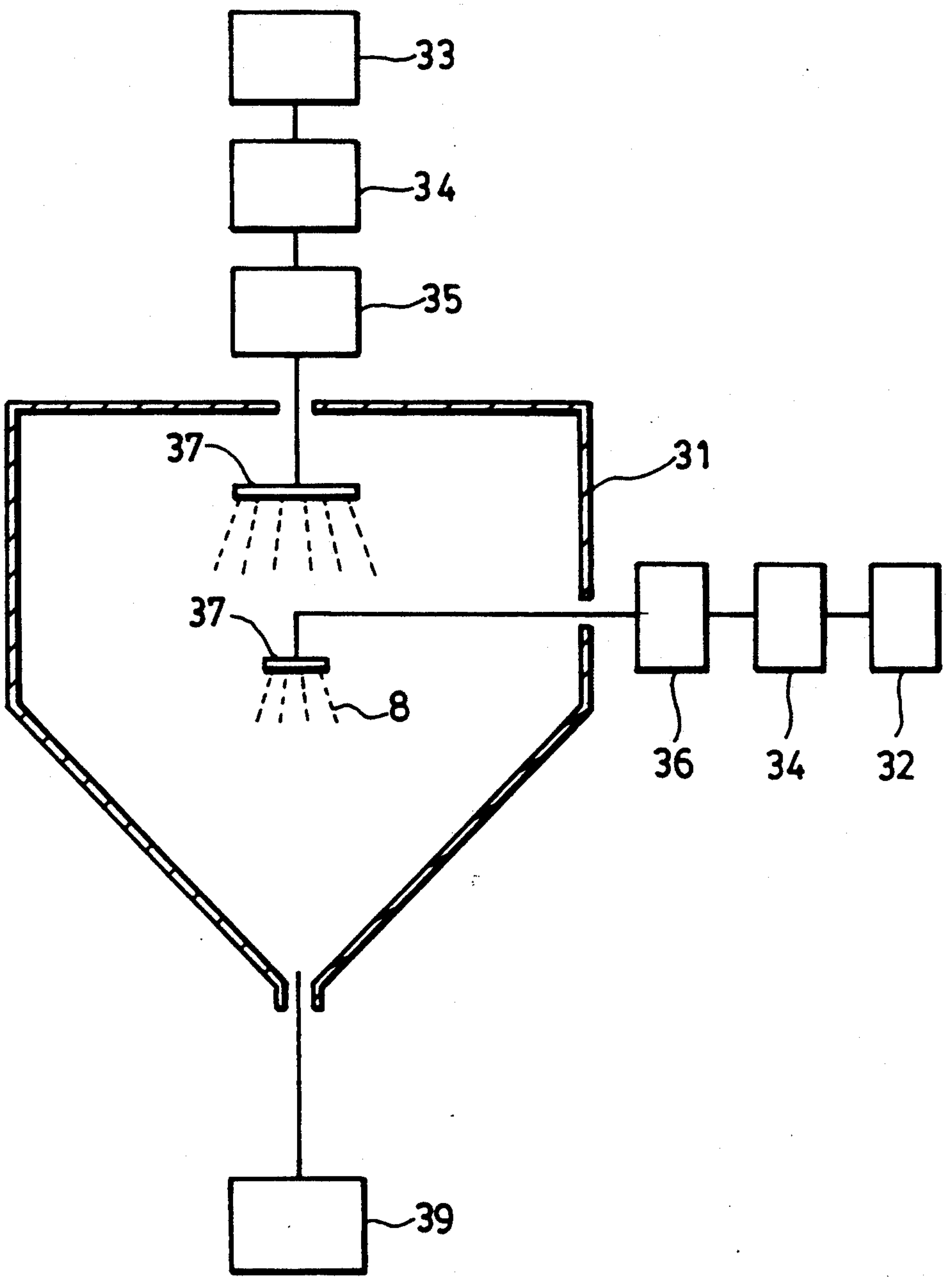

Ammonia was added to the solution in a storage tank 33 in FIG. 6 so that the pH was adjusted to 4.0, followed by passage to an agitation vessel 35 by means of a feed pump 34. On the other hand, 125 kg of zinc oxide was added from the storage tank 32 to the agitation vessel 35 through the feed pump 34 and sufficiently agitated and mixed, followed by spraying from a top of a spray roasting furnace 31 kept at 810° C. by the use of a spraying device 36 and a spraying nozzle 37, so that the solution was oxidized and roasted to obtain a product 39 at the bottom of the furnace.

The X-ray diffraction revealed that the produced oxides consisted of $Fe_2O_3$, $Mn_2O_3$, spinel and a small amount of ZnO and that no chloride was detected.

By a chemical analysis, the composition of Fe, Mn and Zn was determined so that the total of Fe, Mn and Zn was 100 wt %. The deviations in composition of Fe, Mn and Zn are as shown in Table 8, from which it will be seen that as compared with expected concentrations prior to the spray roasting, the oxides for soft ferrites are only slightly different.

1000 g of the starting oxides were weighed, to which 0.1 wt % of $CaCO_3$ and 0.01 wt % of $SiO_2$ were added, followed by further addition of pure water to obtain a slurry concentration of 50%. The slurry was mixed in a rotary ball mill and dried, to which PVA used as a binder was added. After granulation, a troidal core having an outer diameter of 36 mm, an inner diameter of 4 mm and a height of 10 mm was molded and sintered at 340° C. in an atmosphere of nitrogen containing 1% of oxygen.

The resultant sintered core was subjected to measurement of a core loss under conditions of 100 kHz, 200 mT and 100° C., with a good magnetic characteristic of 280 $mW/cm^3$ as shown in Table 9.

COMPARATIVE EXAMPLE 6

3000 liters of a hydrochloric acid pickling waste liquor of steel sheets which had been concentrated to an extent that 25 g of iron was contained in 100 ml was charged with 250 kg of metallic manganese, followed by heating to 80° C. to completely dissolve the metallic manganese therein. After mixing 125 kg of zinc oxide, the mixture was sprayed from the top of a spray roasting furnace and roasted for oxidation to obtain a roasted product at the bottom of the furnace in the same manner as in Example 6.

The X-ray diffraction revealed that the produced oxides consisted of $Fe_2O_3$, $Mn_2O_3$ and spinel and that no chloride was detected.

By a chemical analysis, the composition of Fe, Mn and Zn was determined so that the total of Fe, Mn and Zn was 100 wt %. The deviations in composition of Fe, Mn and Zn are as shown in Table 8, from which it will be seen that as compared with expected concentrations prior to the spray roasting, the Zn is significantly reduced with relative increases in amount of iron and manganese.

1000 g of the starting oxides were weighed, to which ZnO by the amount to give the same content as in Example 6, 0.1 wt % of $CaCO_3$ and 0.01 wt % of $SiO_2$ were added, followed by further addition of pure water to obtain a slurry concentration of 50%. The slurry was mixed in a rotary ball mill and dried, to which PVA used as a binder was added. After granulation, a troidal core having an outer diameter of 36 mm, an inner diameter of 24 mm and a height of 10 mm was molded and sintered at 1340° C. in an atmosphere of nitrogen containing 1% of oxygen.

The resultant sintered cores were subjected to measurement of a core loss under conditions of 100 kHz, 200 mT and 100° C., with a magnetic characteristic of 1800 $mW/cm^3$ as shown in Table 9.

EXAMPLE 7

3000 liters of a hydrochloric acid pickling waste liquor of steel sheets which had been concentrated to an extent that 25 g of iron was contained in 100 ml was charged with 25 kg of metallic manganese, followed by heating to 80° C. to completely dissolve the metallic manganese therein. The solution had a pH of not larger than 0.1.

Figure 7:
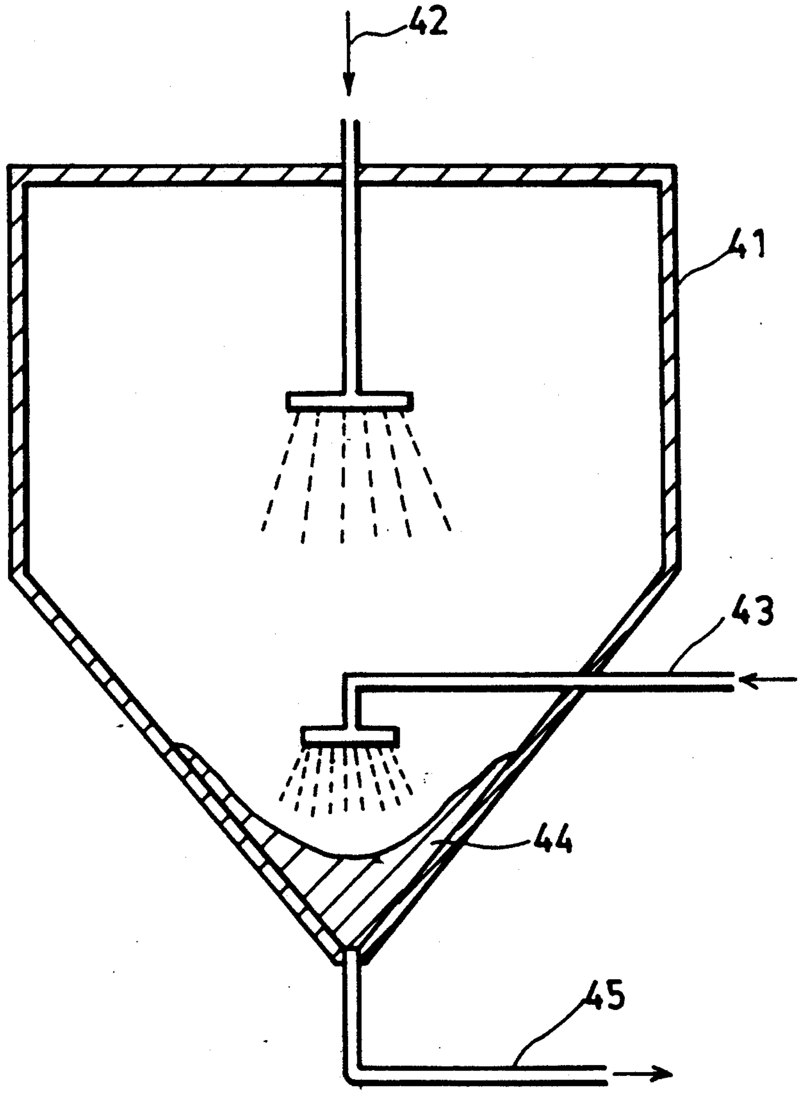
FIGS. 7 and 8 are, respectively, schematic sectional views of production processes of starting oxides for soft ferrites according to examples of the invention.

Ammonia was added to the solution in a tank 33 in FIG. 7 so that the pH was adjusted to 3.2, followed by spraying from a top of a spray roasting furnace 31 kept at 810° C. On the other hand, 125 kg of zinc oxide was mixed with pure water and sprayed from the trunk portion of the roasting furnace 31 through a spraying device 36 and a spray nozzle 37. After completion of the roasting for oxidation, a product 39 was obtained at the bottom of the furnace.

The X-ray diffraction revealed that the produced oxides consisted of $Fe_2O_3$, $Mn_2O_3$, spinel and a small amount of ZnO and that no chloride was detected.

By a chemical analysis, the composition of Fe, Mn and Zn was determined so that the total of Fe, Mn and Zn was 100 wt %. The deviations in composition of Fe, Mn and Zn are as shown in Table 8, from which it will be seen that as compared with expected concentrations prior to the spray roasting, the oxides for soft ferrites are only slightly different.

1000 g of the starting oxides were weighed, to which 0.09 wt % of $CaCO_3$ and 0.013 wt % of $SiO_2$ were added, followed by further addition of pure water to obtain a slurry concentration of 50%. The slurry was mixed in a rotary bail mill and dried, to which PVA used as a binder was added. After granulation, a troidal core having an outer diameter of 36 mm, an inner diameter of 24 mm and a height of 10 mm was molded and sintered at 1340° C. in an atmosphere of nitrogen containing 1% of oxygen.

The resultant sintered core was subjected to measurement of a core loss under conditions of 100 kHz, 200 mT and 100° C., with a good magnetic characteristic of 290 mW/cm³, as shown in Table 9.

COMPARATIVE EXAMPLE 7

3000 liters of a hydrochloric acid pickling waste liquor of steel sheets which had been concentrated to an extent that 25 g of iron was contained in 100 ml was charged with 25 kg of metallic manganese, followed by heating to 80° C. to completely dissolve the metallic manganese therein. The mixture was sprayed from the top of a spray roasting furnace kept at 810° C. as shown in FIG. 7. 125 kg of zinc oxide was mixed with pure water and sprayed from the trunk portion of the roasting furnace as shown in FIG. 7. After roasting for oxidation, a product was obtained at the bottom of the furnace.

The X-ray diffraction revealed that the produced oxides consisted of $Fe_2O_3$, $Mn_2O_3$ and spinel and that no chloride was detected.

By a chemical analysis, the composition of Fe, Mn and Zn was determined so that the total of Fe, Mn and Zn was 100 wt %. The deviations in composition of Fe, Mn and Zn are as shown in Table 8, from which it will be seen that as compared with expected concentrations prior to the spray roasting, the Zn is significantly reduced with relative increases in amount of iron and manganese.

1000 g of the starting oxides were weighed, to which ZnO by the amount to give the same content as in Example 7, 0.09 wt % of $CaCO_3$ and 0.013 wt % of $SiO_2$ were added, followed by further addition of pure water to obtain a slurry concentration of 50%. The slurry was mixed in a rotary ball mill for 8 hours and dried, to which 0.5% of PVA used as a binder was added. After granulation, a troidal core having an outer diameter of 36 mm, an inner diameter of 24 mm and a height of 10 mm was molded and sintered at 1340° C. in an atmosphere of nitrogen containing 1% of oxygen. The resultant sintered cores were subjected to measurement of a core loss under conditions of 100 kHz, 200 mT and 100° C., with a magnetic characteristic of 1650 mW/cm³ as shown in Table 9.

From the results of Examples 6 and 7 and Comparative Examples 6 and 7, the zinc is not deviated in composition according to the invention, which ensures formation of the starting oxides of iron manganese and zinc for soft ferrites having good dispersability, with the possibility that articles having good magnetic characteristics can be fabricated.

In Examples 6 and 7, a method for producing Mn-Zn ferrites from a solution containing iron and manganese chlorides and zinc oxide has been described. The present invention is readily applicable to the method using chloride solution containing nickel and magnesium other than manganese. For the adjustment of the pH, ammonia has been added but the manner of the adjustment is not critical provided that the pH can be adjusted to an intended level.

TABLE 8

| | Analytical Results | | |
|---|---|---|---|
| | Fe | Mn | Zn |
| Formulated values | 68.2 | 22.4 | 9.1 |
| Composition After Roasting in Example 6 | 68.9 | 23.0 | 8.1 |
| Composition After Roasting in Comp. Ex. 6 | 74.9 | 24.8 | 0.3 |
| Composition After Roasting in Example 7 | 68.5 | 22.8 | 8.7 |
| Composition After Roasting in Comp. Ex. 7 | 74.5 | 24.8 | 0.7 |

TABLE 9

| | Core Loss (100 KHz, 200 mT, 100° C.) |
|---|---|
| Example 6 | 280 mW/cm³ |
| Comparative Example 6 | 1800 mW/cm³ |
| Example 7 | 290 mW/cm³ |
| Comparative Example 7 | 1650 mW/cm³ |

Example 8

3000 liters of a hydrochloric acid pickling waste liquor of steel sheets which had been concentrated to an extent that 25 g of iron was contained in 100 ml was charged with 25 kg of metallic manganese, followed by heating to 80° C. to completely dissolve the metallic manganese therein. Thereafter, the solution 42 was sprayed from the top of a spray roasting furnace 41 kept at 810° C. as shown in FIG. 7 and roasted for oxidation to obtain a roasted product 44 at the bottom of the furnace. While the oxides 44 obtained at the bottom of the furnace was resided at the furnace bottom, 500 liters of an aqueous solution containing 15 g of zinc chloride in 100 ml was sprayed from a side 43 of the furnace bottom. The bottom temperature was 700° C. After residence for 1 hour at the bottom of the furnace, the resultant oxide 45 was collected from the bottom of the furnace.

The X-ray diffraction revealed that the produced oxides consisted of $Fe_2O_3$, $Mn_2O_3$ and spinel and that no zinc chloride was detected.

By a chemical analysis, the composition of Fe, Mn and Zn was determined so that the total of Fe Mn and Zn was 100 wt %. Table 10 shows the results of the chemical analysis on the expected composition of Fe, Mn and Zn at the time of the formulation in Example 8 and the composition of the oxide after the roasting. The composition of Fe, Mn and Zn is not different from the expected composition prior to the spray roasting and is suitable as starting oxides for soft ferrites 1000 g of the starting oxides were weighed, to which PVA used as a binder was added. After granulation, a troidal core having an outer diameter of 36 mm, an inner diameter of 24 mm and a height of 10 mm was molded and sintered at 1340° C. in an atmosphere of nitrogen containing 1% of oxygen.

The resultant sintered cores were subjected to measurement of an initial permeability under conditions of 1 kHz, 0.4 A/M and 25° C. Table 11 shows the results of the measurement of the initial permeability, from which it will be seen that a good magnetic characteristic of 7000 is obtained.

COMPARATIVE EXAMPLE 8

3000 liters of a hydrochloric acid pickling waste liquor of steel sheets which had been concentrated to an extent that 25 g of iron was contained in 100 ml was charged with 250 kg of metallic manganese, followed by heating to 80° C. to completely dissolve the metallic manganese therein. Thereafter, the solution was sprayed from the top of a spray roasting furnace kept at 850° C. and roasted for oxidation to obtain a roasted product at the bottom of the furnace. The oxides obtained at the bottom of the furnace were cooled in air, after which 1000 g of the oxides were weighed and mixed with 75 g of guaranteed zinc oxide in the form of powder in a ball mill for 10 hours.

PVA used as a binder was added to the mixed oxide powder. After granulation, a tropical core having an outer diameter of 38 mm, an inner diameter of 24 mm and a height of 10 mm was molded and sintered at 1340° C. in an atmosphere of nitrogen containing 1% of oxygen.

The resultant sintered cores were subjected to measurement of an initial permeability under conditions of 1 kHz, 0.4 A/M and 25° C. As shown in Table 11, the permeability is as low as 4000.

The results of Example 8 and Comparative Example 8 reveal that according to the invention, oxides of iron, manganese and zinc are produced without involving mixing of zinc oxide, so that it is possible to prepare starting oxides for soft ferrites having good dispersability. As a result, it is also possible to produce articles having good magnetic characteristics. In addition, since an oxidation and roasting temperature kept at the bottom of the furnace is utilized, the oxides can be produced at costs lower than in prior art processes.

EXAMPLE 9

Figure 8:
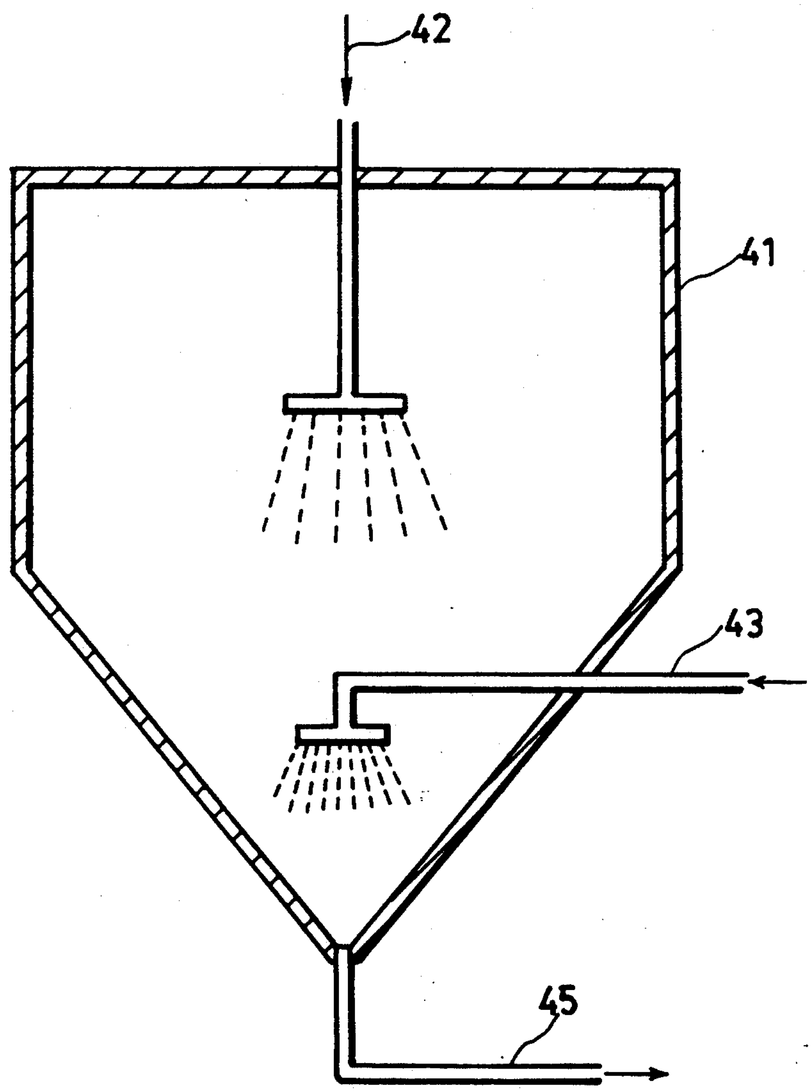

A chloride aqueous solution controlled to have 30 g of iron ions and 10 g of manganese ions in 100 ml was prepared. The aqueous solution was sprayed from the top of a spray roasting furnace 41 kept at 790° C. as shown in FIG. 8. When the aqueous solution was roasted for oxidation, an aqueous solution 43 of zinc chloride ($ZnCl_2$) having a concentration of 12.4 g,/100 ml was sprayed from a position of a trunk portion of the furnace having a temperature of 550° C. The resultant oxide powder 45 obtained from the bottom of the furnace was subjected to X-ray diffraction, with the result that formation of $Fe_2O_3$, $Mn_2O_3$ and spinel was confirmed.

According to a chemical analysis the composition of Fe, Mn and Zn is shown in Table 10 and thus, starting oxides for soft ferrites without involving any shift in composition were found to be obtained.

After addition of 900 ppm of guaranteed calcium carbonate ($CaCO_3$) and 100 ppm of guaranteed silica ($SiO_2$) were added to the starting oxides, to which pure water was added to obtain a 50% slurry, followed by mixing in an attritor for 20 minutes, granulating with a spray dryer and molding by a mechanical press to obtain a toroidal form having an outer diameter of 36 mm, an inner diameter of 24 mm and a height of 10 mm.

The molding was sintered at 1280° C. in an atmosphere of nitrogen containing 1% of oxygen for 3 hours to obtain a sintered core. The core loss of the resultant core at 100 kHz, 200 mT and 80° C. is shown in Table 12.

COMPARATIVE EXAMPLE 9

A chloride aqueous solution controlled to have 30 g of iron ions and 10 g of manganese ions in 100 ml was prepared. The aqueous solution was sprayed from the top of a spray roasting furnace kept at 790° C. and roasted for oxidation. The resultant oxide powder obtained from the bottom of the furnace was subjected to X-ray diffraction, with the result that formation of $Fe_2O_3$, $Mn_2O_3$ and spinel was confirmed.

75 g of zinc oxide (ZnO) was formulated per 1 kg of the starting oxides to which 900 ppm of guaranteed calcium carbonate ($CaCO_3$) and 100 ppm of guaranteed silica ($SiO_2$) were added, after which pure water was added to obtain a 50% slurry, followed by mixing in attritor for 20 minutes, drying with a spray dryer to obtain particles and mechanically press molding to obtain a toroidal form having an outer diameter of 36 mm, an inner diameter of 24 mm and a height of 10 mm.

The molding was sintered at 1280° C. in an atmosphere of nitrogen containing 1% of oxygen for 3 hours to obtain a sintered core. The core loss of the resultant core at 100 kHz, 200 mT and 80° C. is also shown in Table 13.

The results of Example 9 and Comparative Example 9 reveal that according to the invention, zinc chloride is mixed at the stage of formation of the oxides, so that uniform dispersability of Zn is improved at lower costs than in the production of ferrites according to known procedures, with products having better magnetic characteristics.

In the above example, the chlorides are sprayed in the form of an aqueous solution but they may be added in the form of a powder.

Moreover, although zinc chloride is added after or during oxidation of iron chloride and manganese chloride and roasted, the ingredients are not limited to those set out above. Aside from manganese chloride, at least one of nickel chloride and magnesium chloride may be used.

TABLE 10

| | Results of Analysis (wt %) | | |
|---|---|---|---|
| | Fe | Mn | Zn |
| Expected Formulation values | 69.8 | 23.2 | 7.0 |
| Composition After Roasting in Example 8 | 70.3 | 22.8 | 6.9 |
| Composition After Roasting in Example 9 | 70.3 | 22.9 | 6.8 |

TABLE 11

| | Initial Permiability (1 KHz, 0.4 A/M 25° C.) |
|---|---|
| Example 8 | 7000 |
| Comp. Ex. 8 | 4000 |

TABLE 12

| | Core Loss (100 KHz, 200 mT, 80° C.) |
|---|---|
| Example 9 | 350 mW/cm$^3$ |
| Comp. Ex. 9 | 400 mW/cm$^3$ |

What is claimed is:

1. In a method for producing a starting oxide for making soft ferrites, which oxide comprises iron, zinc and at least one metal selected from the group consisting of manganese, magnesium, nickel and copper, the steps comprising feeding a mixed chloride aqueous solution of iron chloride and at least one chloride selected from the group consisting of chlorides of manganese, magnesium, nickel and copper to a furnace and roasting the aqueous solution for oxidation at high temperatures to obtain a composite oxide consisting of iron and at least one metal selected from the group consisting of manganese, magnesium, nickel and copper; and at a position within the furnace where the composite oxide is being formed or the produced composite oxide has heat of roasting and which has a temperature of not lower than 400° C., adding zinc oxide and/or a compound capable of ready conversion into zinc oxide at the existing temperature, thereby producing an oxide by the action of the heat of roasting.

2. The method according to claim 1, wherein the zinc oxide and/or the zinc compound capable of ready conversion into zinc oxide is added in the form of a powder or a slurry.

3. The method according to claim 1, wherein the zinc oxide and/or the zinc compound capable of ready conversion into zinc oxide is added in the vicinity of a position within the furnace at which the aqueous solution is fed.

4. The method according to claim 1, wherein the finally obtained oxide is kept at a temperature of from 300° to 1000° C. whereby the content of chlorine in the finally obtained oxide is reduced while promoting formation of a spinel phase.

5. In a method for producing a starting oxide for making soft ferrite, which oxide comprises iron, zinc and at least one metal selected from the group consisting of manganese, magnesium, nickel and copper, the steps comprising feeding a mixed chloride aqueous solution of iron chloride and at least one chloride selected from the group consisting of chlorides of manganese, magnesium, nickel and copper to a furnace and roasting the aqueous solution for oxidation at high temperatures to obtain a composite oxide comprised of iron and at least one metal selected from the group consisting of manganese, magnesium, nickel and copper;

keeping the composite oxide at a temperature of from 300° to 1000° C. to reduce the content of chlorine in the composite oxide; and adding zinc oxide and/or a compound capable of ready conversion into zinc oxide to the step of reducing the chlorine in the composite oxide, thereby obtaining an oxide which has a reduce content of chloride and undergoes facilitated formation of a spinel phase and which is useful as a starting material for soft ferrites.

6. The method according to claim 5, wherein the zinc oxide and/or the zinc compound capable of ready conversion into zinc oxide is added in the form of a powder or a slurry.

7. In a method for producing a starting oxide for making soft ferrites, which oxide comprises iron, zinc and at least one metal selected from the group consisting of manganese, magnesium, nickel and copper, the steps comprising adjusting for neutralization a mixed chloride aqueous solution of iron chloride and at least one chloride selected from the group consisting of chlorides of manganese, magnesium, nickel and copper to a pH of from 0.2 to 7.0;

feeding the pH adjusted mixed chloride aqueous solution to a furnace and roasting the oxidation at high temperatures to obtain a composite oxide comprised of iron and at least one metal selected from the group consisting of manganese, magnesium, nickel and copper; and adding, at a position within the furnace where the composite oxide is being formed and which has a furnace temperature of not lower than 400° C., zinc oxide and/or a compound capable of ready conversion into zinc oxide, thereby producing an oxide useful as a starting material for making soft ferrites by the action of the heat of the roasting.

8. The method according to claim 7, wherein the zinc oxide and/or the zinc compound capable of ready conversion into zinc oxide is added in the form of a powder or a slurry.

9. The method according to claim 7, wherein the finally obtained oxide is kept at a temperature of from 300° to 1000° C. whereby the content of chlorine in the finally obtained oxide is reduced while promoting formation of a spinel phase.

10. In a method for producing a starting oxide for making soft ferrites, which oxide comprises iron, zinc and at least one metal selected from the group consisting of manganese, magnesium, nickel and copper, the steps comprising adjusting for neutralization a mixed chloride aqueous solution of iron chloride and at least one chloride selected from the group consisting of chlorides of manganese, magnesium, nickel and copper to a pH of from 0.2 to 7.0;

feeding zinc oxide and/or a zinc compound capable of ready conversion into zinc oxide to the pH adjusted mixed chloride aqueous solution to obtain a suspension; and feeding quickly the suspension to a furnace and roasting for oxidation at high temperatures to obtain an oxide useful as a starting material for making soft ferrites.

11. The method according to claim 10, wherein the zinc oxide and/or the zinc compound capable of ready conversion into zinc oxide is added in the form of a powder or a slurry.

12. The method according to claim 10, wherein the finally obtained oxide is kept at a temperature of from 300° to 1000° C. whereby the content of chlorine in the finally obtained oxide is reduced while promoting formation of a spinel phase.

13. A method for producing a starting oxide for making soft ferrites which comprises iron, zinc and at least one metal selected from the group consisting of manganese, magnesium, nickel and copper, comprising feeding a mixed chloride aqueous solution of iron chloride and at least one chloride selected from the group consisting of chlorides of manganese, magnesium, nickel and copper to a furnace and roasting the aqueous solution for oxidation at high temperatures to obtain a composite oxide comprised of iron and at least one metal selected from the group consisting of manganese, magnesium, nickel and copper; and adding zinc chloride at a position within the furnace where the composite oxide is being formed or the produced composite oxide has heat of roasting and which has a temperature of not lower than 400° C. but not higher than 900° C., thereby obtaining an oxide useful as a starting material making soft ferrites by the action of the heat of the roasting.

14. The method according to claim 13, wherein the zinc chloride is added by feeding a powder of zinc chloride or by spraying an aqueous solution of zinc chloride.

15. The method according to claim 13, further comprising keeping the finally obtained oxide at a temperature of from 300° to 1000° C. whereby the content of chlorine in the oxide is reduced while promoting formation of a spinel phase.

16. A method for producing a starting oxide for soft ferrites which comprises iron, zinc and at least one metal selected from the group consisting of manganese, magnesium, nickel and copper, comprising feeding a mixed chloride aqueous solution of iron chloride and at least one chloride selected from the group consisting of chlorides of manganese, magnesium, nickel and copper to a furnace and roasting the aqueous solution for oxidation at high temperatures to obtain a composite oxide comprised of iron and at least one metal selected from the group consisting of manganese, magnesium, nickel and copper;

keeping the composite oxide at a temperature of from 300° to 1000° C. to reduce a content of chlorine in the composite oxide; and adding zinc chloride to the step of reducing the chlorine in the composite oxide, thereby obtaining an oxide which has a reduced content of chlorine and undergoes facilitated formation of a spinel phase and which is useful as a starting material for soft ferrites by the action of the heat of the roasting.

17. The method according to claim 16, wherein the zinc chloride is added by feeding a powder of zinc chloride or by spraying an aqueous solution of zinc chloride.

* * * * *